(12) United States Patent
Wu et al.

(10) Patent No.: US 11,275,966 B2
(45) Date of Patent: Mar. 15, 2022

(54) CALCULATION METHOD USING PIXEL-CHANNEL SHUFFLE CONVOLUTIONAL NEURAL NETWORK AND OPERATING SYSTEM USING THE SAME

(71) Applicant: REALTEK SEMICONDUCTOR CORP., Hsinchu (TW)

(72) Inventors: Chun-Chang Wu, Taichung (TW); Shih-Tse Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 229 days.

(21) Appl. No.: 16/790,979

(22) Filed: Feb. 14, 2020

(65) Prior Publication Data
US 2020/0401847 A1    Dec. 24, 2020

(30) Foreign Application Priority Data
Jun. 24, 2019   (TW) ................. 108121979

(51) Int. Cl.
*G06K 9/62*   (2006.01)
*G06K 9/54*   (2006.01)
*G06N 3/04*   (2006.01)

(52) U.S. Cl.
CPC ............ *G06K 9/6232* (2013.01); *G06K 9/54* (2013.01); *G06K 9/6257* (2013.01); *G06N 3/04* (2013.01)

(58) Field of Classification Search
CPC ...... G06K 9/6232; G06K 9/54; G06K 9/6257; G06N 3/04; G06N 3/08; G06N 3/0454
(Continued)

(56) References Cited

U.S. PATENT DOCUMENTS

| 2018/0096226 A1* | 4/2018 | Aliabadi ................. G06N 3/04 |
| 2018/0189642 A1 | 7/2018 | Boesch et al. |

(Continued)

FOREIGN PATENT DOCUMENTS

| CN | 106779060 A | 5/2017 |
| CN | 207993065 U | 10/2018 |

OTHER PUBLICATIONS

Bichen Wu, et al., "Shift: A Zero FLOP, Zero Parameter Alternative to Spatial Convolutions", IEEE Conference on Computer Vision and Pattern Recognition (CVPR), 2018, pp. 9127-9135.
(Continued)

*Primary Examiner* — Juan A Torres
(74) *Attorney, Agent, or Firm* — Li & Cai Intellectual Property (USA) Office

(57) ABSTRACT

A calculation method using pixel-channel shuffle convolutional neural network is provided. In the method, an operating system receives original input data. The original input data is pre-processed by a pixel shuffle process to be separated into multiple groups in order to minimize dimension of the data. The multiple groups of data are then processed by a channel shuffle process so as to form multiple groups of new input data selected for convolution operation. The unselected data are abandoned. Therefore, the dimension of the input data can be much effectively minimized. A multiplier-accumulator of the operating system is used to execute convolution operation using a convolution kernel and the multiple new groups of input data. Multiple output data are then produced.

20 Claims, 9 Drawing Sheets

(58) Field of Classification Search
USPC .......................................................... 382/157
See application file for complete search history.

(56) References Cited

U.S. PATENT DOCUMENTS

| 2019/0220709 | A1* | 7/2019 | Freeman | G06N 3/08 |
| 2020/0074288 | A1* | 3/2020 | Zhang | G06N 3/063 |
| 2020/0089506 | A1* | 3/2020 | Power | G06N 3/063 |
| 2021/0166350 | A1* | 6/2021 | Wang | G06K 9/6256 |

OTHER PUBLICATIONS

Forrest N. Iandolar, et al., "Squeezenet: Alexnet-Level Accuracy With 50X Fewer Parameters and <0.5MB Model Size", ICLR 2017, Nov. 4, 2016, pp. 1-13.

Joseph Redmon, et al., "YOLO9000: Better, Faster, Stronger", Computer Science, http://pjreddie.com/yolo9000/, Dec. 25, 2016, pp. 2-9.

Andrew G. Howard, et al., "MobileNets: Efficient Convolutional Neural Networks for Mobile Vision Applications", Computer Science, https://arxiv.org/abs/1704.04861, Apr. 17, 2017, pp. 1-9.

Mark Sandler, et al., "MobileNetV2: Inverted Residuals and Linear Bottlenecks", Computer Science, https://arxiv.org/abs/1801.04381, Mar. 21, 2019.

* cited by examiner

CALCULATION METHOD USING PIXEL-CHANNEL SHUFFLE CONVOLUTIONAL NEURAL NETWORK AND OPERATING SYSTEM USING THE SAME

CROSS-REFERENCE TO RELATED PATENT APPLICATION

This application claims the benefit of priority to Taiwan Patent Application No. 108121979, filed on Jun. 24, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is generally related to a data processing technology with a convolutional neural network, and more particularly to a calculation method and an operating system using convolutional neural network that can maintain recognition accuracy while processing a pre-operation through pixel and channel shuffles and achieve minimization of the computation and storage space.

BACKGROUND OF THE DISCLOSURE

In a field of Artificial Intelligence (AI), a machine learning technology is a major subset of AI algorithm. In the process of machine learning, a Convolutional Neural Network (CNN) is a feedforward neural network that is an architecture applied to an image processing process, and especially to image recognition, object detection and image slicing.

Developments of models and algorithm based on the convolutional neural network have accomplished great achievements in recent years. Nevertheless, even though the convolutional neural network has high accuracy in image feature extraction and recognition, the conventional CNN is still hard to be implemented on hardware since CNN requires a huge amount of layer-by-layer computations.

In recent years, many research institutes have developed some neural networks suitable for hardware computation, for example Mobile Net that uses operations of Depth-Wise Separable Convolution and Shift Convolution. Such developments focus on maintaining the original accuracy and further minimizing the amount of computation and storage space for the modeling.

The computation of the convolutional neural network can be moved to a cloud server or a computer host due to the huge amount of computation. In one of the conventional technologies, an application such as Artificial Intelligence of Things (RIOT) transfers the image data to the cloud server for the computation.

For maintaining the accuracy as well as reducing modeling parameters and computation, one of the conventional technologies such as SqueezeNet (2016) is provided. In SqueezeNet (2016), a bigger convolution kernel is divided into several modules without changing the convolution operation in order to minimize the computing parameters. The conventional technologies are such as MobileNet v1 (2017) and MobileNet v2 (2018). MobileNet v1 (2017) uses a depth-wise separable convolution module to replace the original k*k convolution operation. The depth-wise separable convolution module is as a depth-wise convolution following a point-wise convolution. In ShiftNet (2018), a shift-convolution is used to replace the depth-wise convolution in order to minimize the amount of parameters in storage and convolution operations.

SUMMARY OF THE DISCLOSURE

The disclosure is generally related to a calculation method using pixel-channel shuffle convolutional neural network and an operating system thereof. In the method, an input data is processed by a pre-operation with a pixel shuffle operation and a channel shuffle operation before processing a convolution operation. The pixel shuffle operation and the channel shuffle operations can minimize dimension of a length, a width and a depth of the input data. Therefore, the computation and usage of memory can be minimized under a condition with the same amount of parameters.

According to one of the embodiments, the calculation method using pixel-channel shuffle convolutional neural network includes using the operating system to receive an original input data. The original input data can be an image data that can be represented by a value with a length, a width and a first amount of depth. A pixel shuffle operation is performed on the original input data by a processor of the operating system, in which the original input data is separated into multiple values for reducing dimension of each of the values. A channel shuffle operation is performed on the values for selecting the values from the multiple values for convolution operation so as to form a plurality of input data. The input data can be temporarily stored in a memory of the system.

Next, a plurality of convolution kernels with respect to the multiple new input data are set up. In one embodiment, a second amount of convolution kernels are included. Every convolution kernel implements a filter. The convolution operation with the second amount of convolution kernels can be performed by a multiplier-accumulator of the processor for producing multiple new input data and forming a second amount of output data.

The original input data is a value with a first amount of depth, and the original input data is processed by the pixel shuffle and the channel shuffle operations so as to form the plurality of input data with depth smaller than the first amount of depth.

Preferably, the original input data is an image data, and the operating system performs the convolution operation for extracting image features from the original input data so as to form a plurality of feature maps with the second amount of depth. If the second amount of output data is processed by an inverse pixel shuffle operation, an image feature map with a second amount of depth is formed.

Preferably, the image feature map is used to recognize the original input data. Further, a length, a width and a depth of each of the convolution kernels used in the convolution operation are positive integers.

According to one embodiment of the operating system using pixel-channel shuffle convolutional neural network, the system includes a processor, a communication circuit and a memory that are electrically connected with the processor. A calculation method using pixel-channel shuffle convolutional neural network is performed in the system.

Further, the operating system can form a cloud system that provides a service of image recognition through the calculation method using the pixel-channel shuffle convolutional neural network.

Furthermore, the operating system may implement an independent circuit system that is adapted to a specific system and is used to perform image recognition through the calculation method using the pixel-channel shuffle convolutional neural network.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
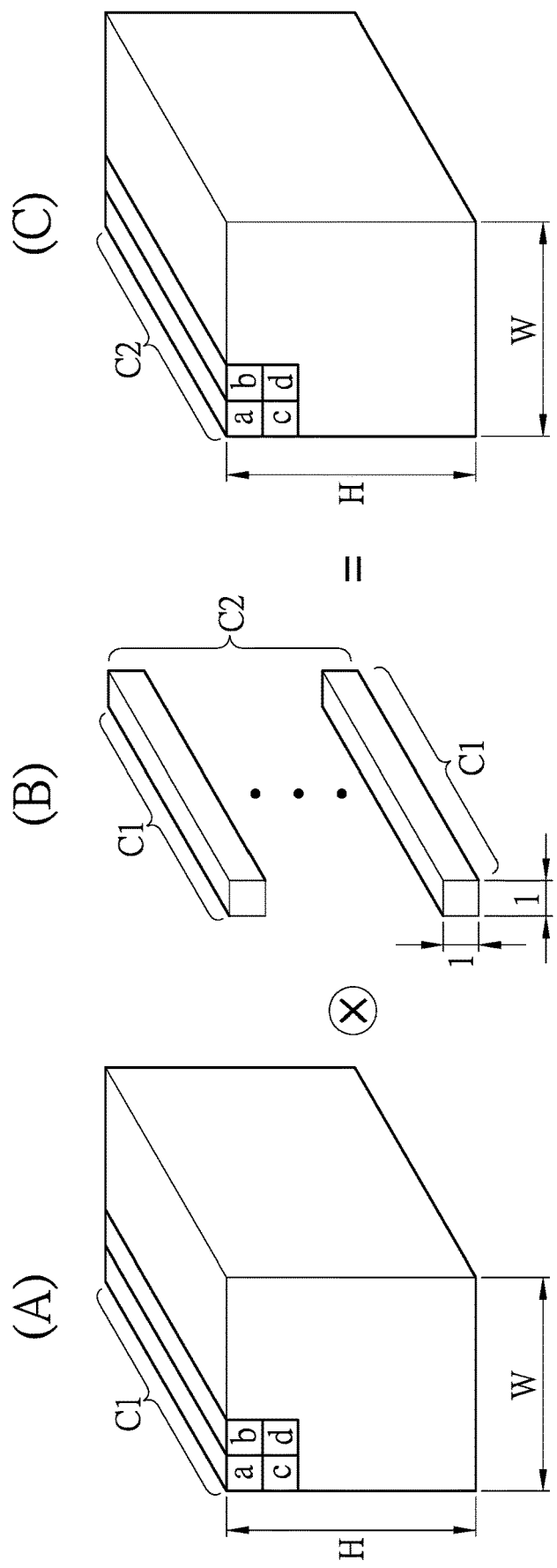
FIG. 1 is a schematic diagram of a point-wise convolution operation.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Convolutional neural networks (CNN) have accomplished significant achievements in applications of image recognition. Many schemes of image processing based on convolutional neural networks have been continuously developed. Nevertheless, since a fully-connected neural network requires interconnected links among neurons between every two adjacent layers, the trained parameters for neural networks are much more in magnitude, and the amount of computation becomes larger due to the high dimension of features of the input layer. Therefore, the progress for convolutional neural network includes two approaches that on the one hand improve accuracy, and on the other hand conduct compression and accelerate modeling computation via a network.

For solving the problem caused by the huge amount of modeling computation in convolutional neural network, a calculation method using pixel-channel shuffle convolutional neural network and an operating system thereof are provided to maintain the accuracy and also minimize the amount of modeling parameters and computation. In an aspect, a depth-wise separable convolution module is used in the calculation method. The depth-wise separable convolution module includes a depth-wise convolution and uses a pixel-channel shuffle convolutional neural network to replace the conventional point-wise convolution for reducing the amount of computation. For example, under a specific environment, an experiment shows that the amount of computation and the usage of memory can be reduced to one quarter of the conventional point-wise convolution.

Under the requirements of maintaining accuracy and reducing the modeling parameters and computation, for image recognition and detection in the convolutional neural network, the calculation method using pixel-channel shuffle convolutional neural network can achieve the following functions. For example, in the calculation method, the amount of channel operation can be minimized if the method adopts the feature maps in the convolutional neural network (CNN). Further, in the calculation method, the amount of computation and the usage of memory can be minimized if the method combines the pixel shuffle operation and the channel shuffle operation.

Reference is made to FIG. 1 that shows a schematic diagram of a point-wise convolution operation in one embodiment of the disclosure.

FIG. 1(A) shows an input layer of a point-wise convolution operation. A cube represents the input layer in this example. The marks a, b, c, d represent a first layer input data that is such as a cube with a length (H), a width (W) and a depth (C1). The depth (C1) represents a first amount C1 of convolution kernels of the input layer.

FIG. 1(B) shows a 1*1 filter that is implemented by one of the convolution kernels. FIG. 1(B) also shows a second amount C2 of the filters. The convolution operation uses the filters to scan and calculate a previous layer with respect to an input layer (FIG. 1(A)) according to a setup by a moving window with a stride. In the calculation, an output data shown in FIG. 1(C) is obtained by an operation of multiplication and addition.

FIG. 1(C) shows another cube with a length (H), a width (W) and a depth (C2). The depth (C2) corresponds to a second amount C2 of the filters so as to produce the same amount of feature maps. The dimension of feature maps shows the amount of output data with the length (H), the width (W) and the depth (C2).

The convolution kernel implements a filtering mechanism. Reference is made to FIG. 1(B). Every parameter in the convolution kernel is equivalent to a weight parameter in the neural network. The parameter is also correlated with a portion of pixels. The moving window is used to scan and calculate the layer so as to multiply every parameter of convolution kernel by its correlated portion of pixels, and then to sum up the multiplication results. The final summation allows the convolution kernel to retrieve features of the image and is ready for performing feature mapping.

FIG. 1(B) is a schematic diagram depicting a convolution operation performed on an input data and a filter. In an exemplary example, a size of the filter is 1*1, and a depth of the filter is 16 (the first amount C1). The input data is multiplied by a filter (1*1*16). An output feature map is an output data with a size of H*W*1. Similarly, if the amount of filters is C2 (FIG. 1(B)), the amount C2 of feature maps is obtained. Another cube is obtained by combining the amount C2 of feature maps. In other words, after convolution operation with the input data and the filters, an output layer shown in FIG. 1(C) is formed. The size of the output layer is H*W*C2, which is also the size of output data. The convolution operation uses an amount (second amount C2) and filters (convolution kernels) shown in FIG. 1(B). The first amount C1 of filters (e.g. 16, FIG. 1(B)) are multiplied by the same amount (e.g. 16, FIG. 1(A)) of input data at every position. The multiplication results are then summed up. The second amount C2 of filters form the second amount C2 of feature maps through convolution operation. A feature map with H*W*C2 can be obtained as the output data of convolution operation by combining the second amount C2 of feature maps.

Figure 2:
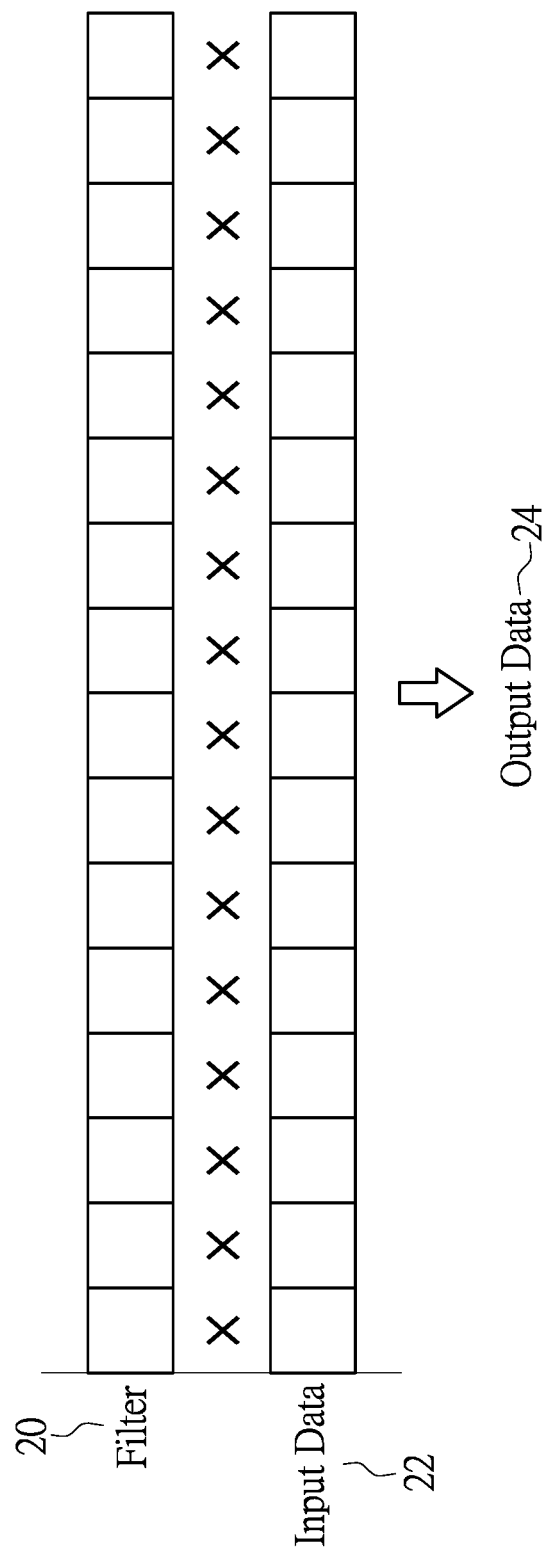
FIG. 2 is a schematic diagram depicting a convolution operation with a filter and an input data at one position.

FIG. 2 schematically shows a convolution operation with a filter and an input data at a position. A filter 20 with a first amount C1 can be any value on demand. This example shows the convolution operation performed on the first amount 16 of the filter 20 and an input data 22. The input data 22 is shown at a position 'a' of FIG. 1(A) and has a first amount C1 of values, e.g. 16. In the calculation method using pixel-channel shuffle convolutional neural network, not every position of the input data 22 needs to be multiplied by all the first amount C1 of filters but the multiplication is performed based on a special rule. In the special rule, several geometric positions of the input data 22 are selected to be multiplied by the different values of filter 20 so as to obtain an output data 24. The multiplication result shows that the amount of computation is minimized.

Figure 3:
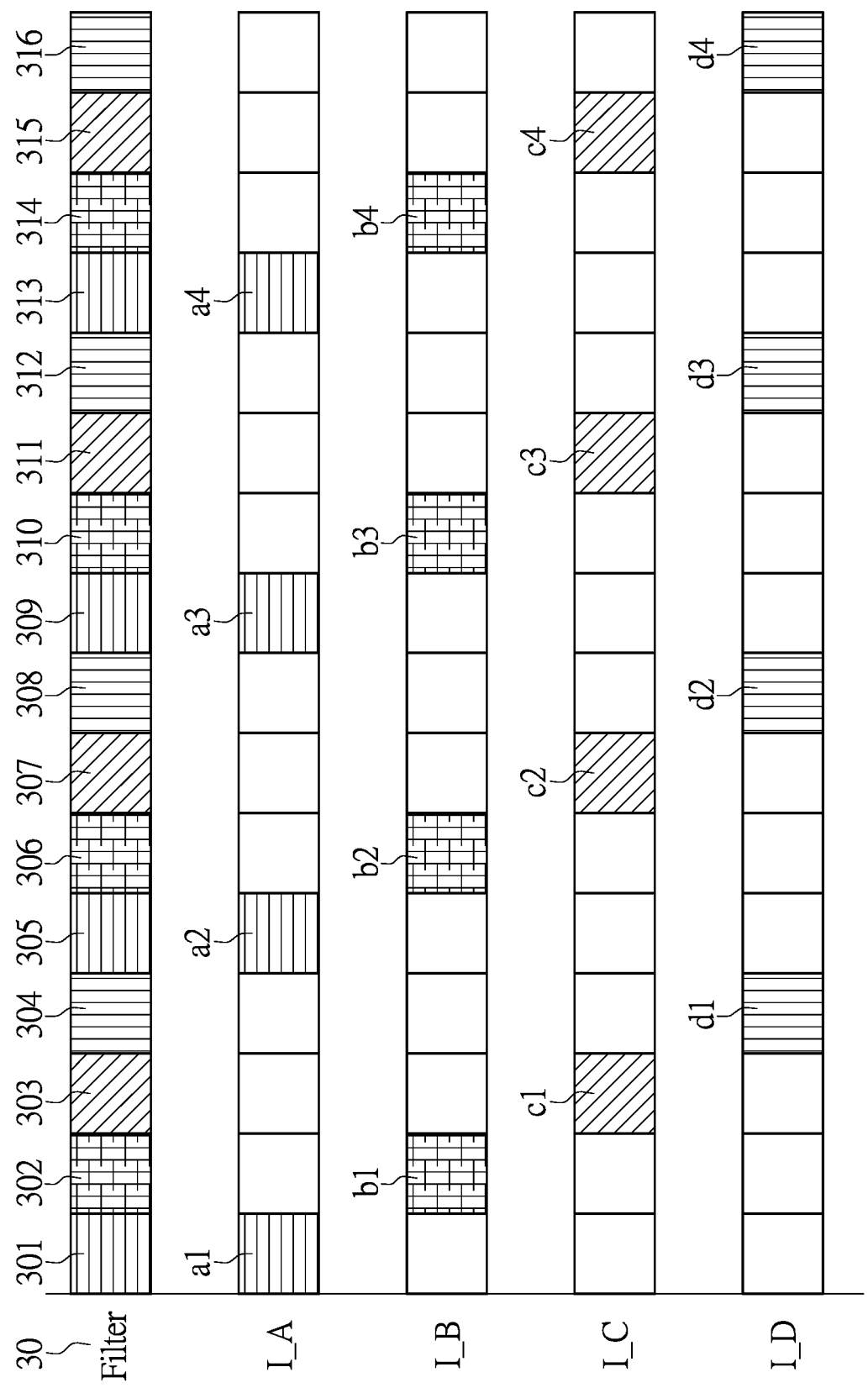
FIG. 3 is a schematic diagram depicting a calculation method using pixel-channel shuffle convolutional neural network according to one of embodiment of the disclosure.

FIG. 3 shows a schematic diagram describing the calculation method using pixel-channel shuffle convolutional neural network according to one embodiment of the disclosure. A 2*2 input data is shown. Each of the input data has a first amount C1 of values, e.g. 16. The input data can be marked as 'a', 'b', 'c' and 'd' and can be indicative of pixels of an input image to be processed by the operating system. The convolution operation uses a filter 30 and the filters marked as 301 to 316 in the values of each layer. For reducing amount of computation, the filter 30 sets up a rule of multiplication and summation according to a need to minimize the amount of computation.

In the current example, the input data is composed of 2*2 regions. Four consecutive pixels form a group and the filter 30 is configured to be classified into four groups at an interval of 4. In the diagram, the filters marked as '301', '305', '309' and '313' can be set as a first group of filters; the filters marked as '302', '306', '310' and '314' can be set as a second group of filters; the filters marked as '303', '307', '311' and '315' can be set as a third group of filters; and the filters marked as '304', '308', '312' and '316' can be set as a fourth group of filters. The groups of filters can be calculated by convolution operation with the input data marked as 'a', 'b', 'c' and 'd' in an order, but not with all of the input data. Therefore, the amount of computation can be minimized. It should be noted that a grouping rule applied to the filter and a new operating rule formed after grouping can be stored in a memory of the operating system.

In an exemplary example, the system retrieves the values a1, a2, a3 and a4 from the first amount C1 (e.g. 16) of values of the input data 'a' according to a specific rule, e.g. at an interval of 4. The values a1, a2, a3 and a4 form a first group of input data (I_A). The values a1, a2, a3 and a4 are temporarily stored in the memory of the system. After that, the values a1, a2, a3 and a4 are calculated by convolution operation with the first group of filters being marked as '301', '305', '309' and '313'. The remaining unselected values of the input data 'a' are abandoned for effectively minimizing the amount of computation. The current example shows that the amount of computation has been reduced to one quarter of the original amount. In the convolution operation, multiplication and summation are performed upon the first group of input data (I_A) with the first group of filters at the corresponding positions: (value a1 multiplied by filter 301)+(value a2 multiplied by filter 301)+(value a3 multiplied by filter 301)+(value a4 multiplied by filter 301)=first output data; (value a1 multiplied by filter 305)+(value a2 multiplied by filter 305)+(value a3 multiplied by filter 305)+(value a4 multiplied by filter 305)=second output data; (value a1 multiplied by filter 309)+(value a2 multiplied by filter 309)+(value a3 multiplied by filter 309)+(value a4 multiplied by filter 309)=third output data; (value a1 multiplied by filter 313)+(value a2 multiplied by filter 313)+(value a3 multiplied by filter 313)+(value a4 multiplied by filter 313)=fourth output data. The convolution operation performed on the input data 'a' gains a first output data, a second output data, a third output data and a fourth output data that form a first group of output data (O_A).

Similarly, the system retrieves values b1, b2, b3 and b4 from a first amount C1 (e.g. 16) of the input data 'b' according to a specific rule, e.g. at an interval of 4. The values b1, b2, b3 and b4 form a second group of input data (I_B). The selected input data is temporarily stored in the memory of system. The selected input data is calculated by convolution operation with a second group of filters being marked as '302', '306', '310' and '314'. Similarly, the reset unselected values of the input data 'b' are abandoned. In the convolution operation, multiplication and summation are performed upon the second group of input data (I_B) with the second group of filters at the corresponding positions: (value b1 multiplied by filter 302)+(value b2 multiplied by filter 302)+(value b3 multiplied by filter 302)+(value b4 multiplied by filter 302)=first output data; (value b1 multiplied by filter 306)+(value b2 multiplied by filter 306)+(value b3 multiplied by filter 306)+(value b4 multiplied by filter 306)=second output data; (value b1 multiplied by filter 310)+(value b2 multiplied by filter 310)+(value b3 multiplied by filter 310)+(value b4 multiples filter number 310)=third output data; (value b1 multiplied by filter 314)+(value b2 multiplied by filter 314)+(value b3 multiplied by filter 314)+(value b4 multiplied by filter 314)=fourth output data. The first output data, the second output data, the third output data and fourth output data obtained from the input data 'b' for a second group of output data (O_B).

Similarly, the system retrieves values c1, c2, c3 and c4 from the first amount C1 (e.g. 16) of input data according to a rule, e.g. at an interval of 4. The values c1, c2, c3 and c4 form a third group of input data (I_C). These selected values are temporarily stored in the memory of the system. The values c1, c2, c3 and c4 are calculated by convolution operation with a third group of filters being marked as '303', '307', '311' and '315'. The unselected values of the input data 'c' are abandoned. In the convolution operation, multiplication and summation are performed upon the third group of input data (I_C) with the third group of filters at the corresponding positions: (value c1 multiplied by filter 303)+(value c2 multiplied by filter 303)+(value c3 multiplied by filter 303)+(value c4 multiplied by filter 303)=first output data; (value c1 multiplied by filter 307)+(value c2 multiplied by filter 307)+(value c3 multiplied by filter 307)+(value c4 multiplied by filter 307)=second output data; (value c1 multiplied by filter 311)+(value c2 multiplied by filter 311)+(value c3 multiplied by filter 311)+(value c4 multiplied by filter 311)=third output data; (value c1 multiplied by filter 315)+(value c2 multiplied by filter 315)+(value c3 multiplied by filter 315)+(value c4 multiplied by filter 315)=fourth output data. The first output data, the second output data, the third output data and fourth output data form a third group of output data (O_C).

Further, the system also retrieves values d1, d2, d3 and d4 selected from a first amount C1 (e.g. 16) of input data 'd' according to a rule, e.g. at an interval of 4. The values d1, d2, d3 and d4 form a fourth group of input data (I_D). The selected values of the input data are temporarily stored in the memory of the system, and then calculated by convolution operation with a fourth group of filters being marked as '304', '308', '312' and '316'. The unselected values of the input data are abandoned. Multiplication and summation are performed upon the fourth group of input data (I_D) with the fourth group of filters at the corresponding positions: (value d1 multiplied by filter 304)+(value d2 multiplied by filter 304)+(value d3 multiplied by filter 304)+(value d4 multiplied by filter 304)=first output data; (value d1 multiplied by filter 308)+(value d2 multiplied by filter 308)+(value d3 multiplied by filter 308)+(value d4 multiplied by filter 308)=second output data; (value d1 multiplied by filter 312)+(value d2 multiplied by filter 312)+(value d3 multiplied by filter 312)+(value d4 multiplied by filter 312)=third output data; (value d1 multiplied by filter 316)+(value d2 multiplied by filter 316)+(value d3 multiplied by filter 316)+(value d4 multiplied by filter 316)=fourth output data. The first output data, the second output data, the third output data and fourth output data obtained from the input data 'c' by convolution operation form a fourth group of output data (O_D).

In FIG. 3, the selected input data (a, b, c, d) are configured to form the first group of input data (I_A), the second group of input data (I_B), the third group of input data (I_C) and the fourth group of input data (I_D) respectively. The convolution operation is performed upon these input data. An output data formed by the convolution operation includes the first group of output data (O_A), the second group of output data (O_B), the third group of output data (O_C) and the fourth group of output data (O_D).

According to the above example, it is acknowledged that not all the input data are calculated by convolution operation since some input data are abandoned according to a specific rule. The amount of computation can be effectively minimized.

According to an aspect relating to the above-mentioned embodiments, rather than the conventional point-wise convolution operation, the calculation method using pixel-channel shuffle convolutional neural network separates the point-wise convolution operation into several operations such as a pixel shuffle operation, a channel shuffle operation, a point-wise convolution operation and an inverse pixel shuffle operation.

Figure 4:
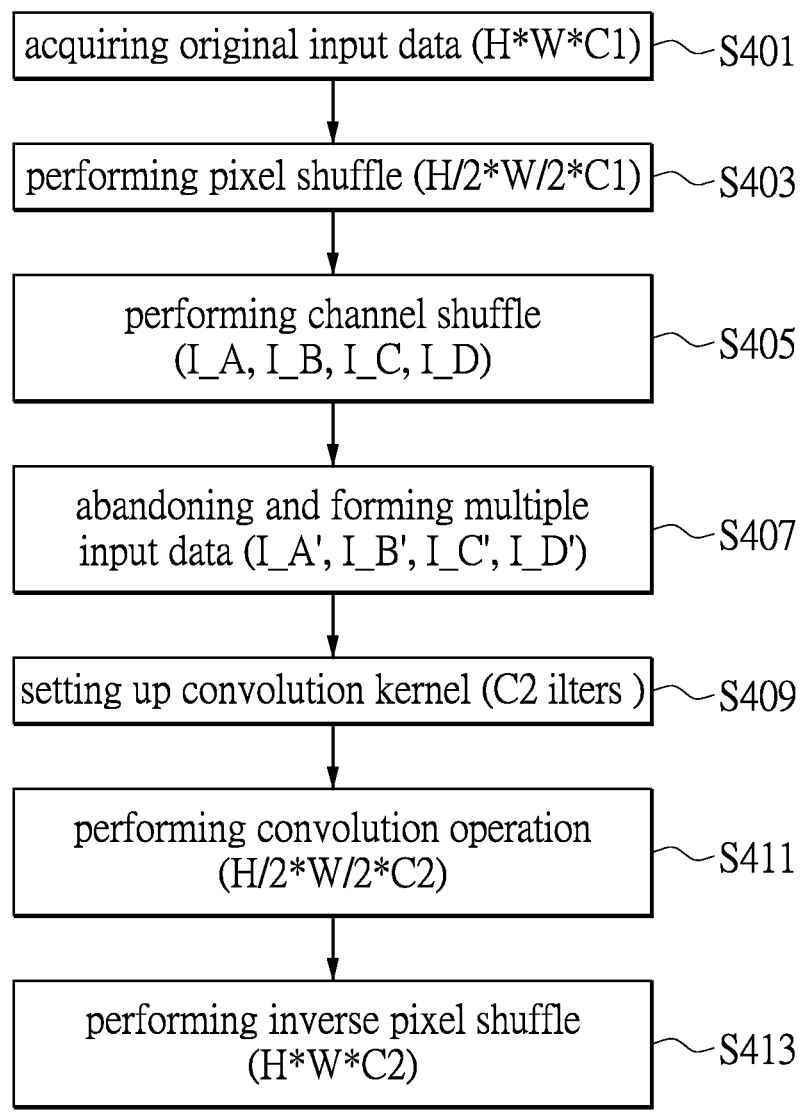
FIG. 4 shows a flow chart describing the calculation method using pixel-channel shuffle convolutional neural network in one embodiment of the disclosure.
Figure 5:
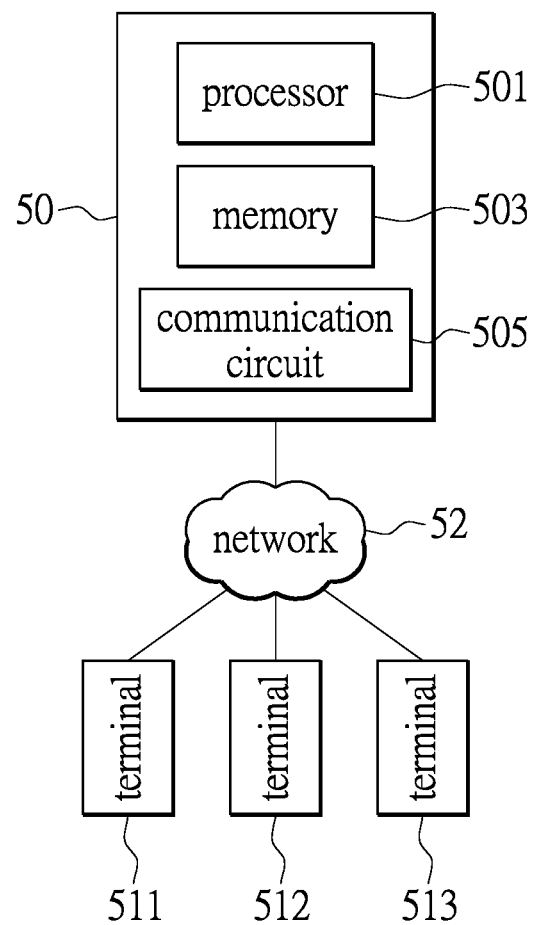
FIG. 5 shows a schematic diagram of an operating system implementing a calculation method using pixel-channel shuffle convolutional neural network in one embodiment of the disclosure.

Referring to the steps shown in FIG. 4 and an operating system of FIG. 5, a system for performing the calculation method using pixel-channel shuffle convolutional neural network can be an operating system 50 used to process images. The operating system 50 includes a processor 501, a communication circuit 505 and a memory 503. The electronic components therein are electrically interconnected. The processor 501 is used to perform a pixel shuffle operation, a channel shuffle operation, a convolution operation and a follow-up inverse pixel shuffle operation in the calculation method. In particular, a multiplier-accumulator of the processor 501 performs multiplication and summation in a convolution operation. The hardware requirements such as the multiplier-accumulator and memory can be effectively minimized due to the calculation method effectively reducing the amount of computation.

It should be noted that aside from being a regular computer system, the operating system 50 can be a cloud system that receives the image data transmitted by the terminal devices 511, 512 and 513 via network 52, and provides service for image recognition through the calculation method using pixel-channel shuffle convolutional neural network. In one further embodiment, the operating system 50 is able to implement an independent circuit system, e.g. an IC, that is applicable to a specific system. The circuit system performs image recognition through a calculation method using the pixel-channel shuffle convolutional neural network.

According to one of the embodiments of the disclosure, the operating system 50 processes an input image for image recognition, the calculation method can obtain features from one single image. The image features relate to each of the pixels of the image, and also associate to the relationship among the pixels. The calculation method can be referred to in a flow chart shown in FIG. 4 in view of the schematic diagrams shown in FIGS. 6 to 9. The figures can be used to acknowledge how the calculation method using pixel-channel shuffle convolutional neural network can not only reduce the amount of computation, but also approach the result of original huge amount of the convolution operation.

Figure 6:
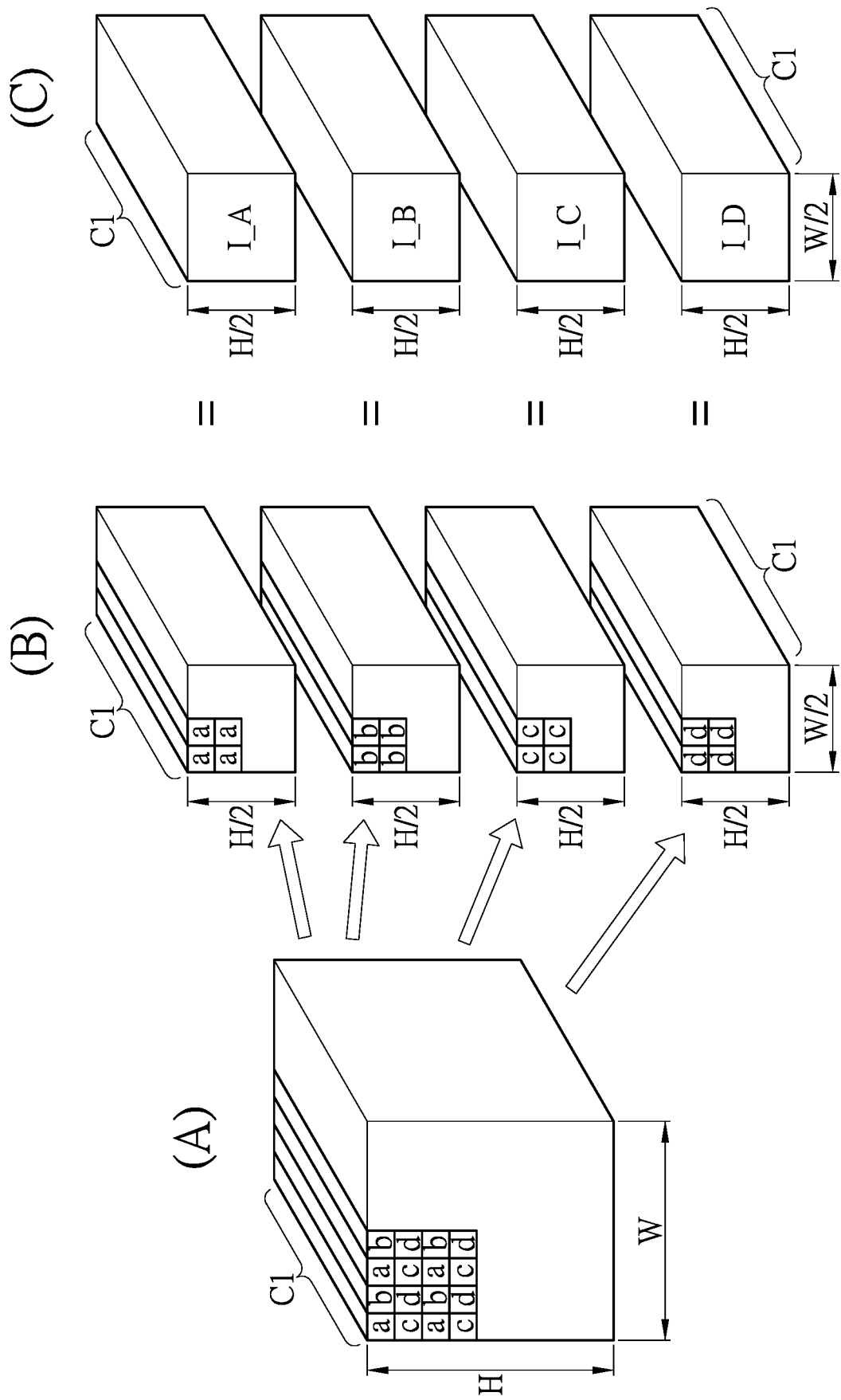
FIG. 6 is a schematic diagram depicting a pixel shuffle operation performed in the calculation method using pixel-channel shuffle convolutional neural network in one embodiment of the disclosure.

Reference is made to FIG. 6 showing a schematic diagram depicting a pixel shuffle operation in the pixel-channel shuffle convolutional neural network in one embodiment of the disclosure.

FIG. 6(A) shows a cube with a length (H), a width (W) and a depth with a first amount C1, e.g. 16, for representing an original input data. The input data a, b, c and d indicate four groups of input data. Each of the input data includes a first amount C1 of values. In step S401 of FIG. 4, the operating system receives the original input data of size H*W*C1. The original input data can be an image data with a length, a width and a depth.

The operating system performs a shuffle operation to the original input data. The shuffle operation can be a pixel shuffle operation. In step S403 of FIG. 4, the processor of operating system performs a step of separating the original input data into multiple groups of values that can reduce the dimension of each of the values of the original input data. In another aspect, the method may reduce the dimension of length and width, but not of the depth. In FIG. 6(B), the original input data is separated into four groups that form four cubes with a length H/2, a width W/2 and a first amount C1 of depth. In fact, in this case the length and the width of the cube can be halved in size. FIG. 6(C) further shows a first group of input data (I_A), a second group of input data (I_B), an third group of input data (I_C) and a fourth group of input data (I_D) within a first amount C1 of feature maps. These data in the operating process can be temporarily stored in the memory of the system for a further procedure.

Figure 7:
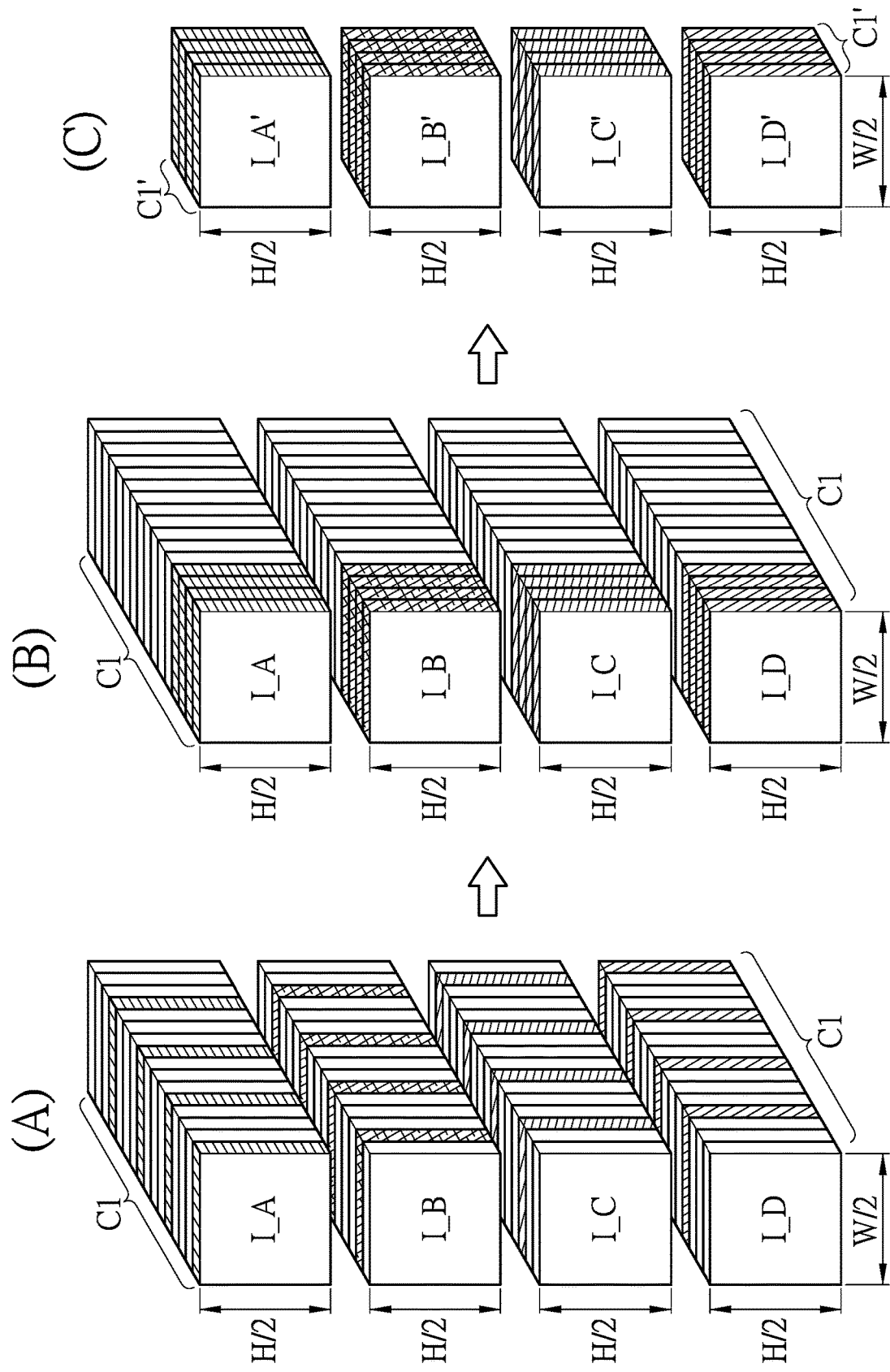
FIG. 7 is a schematic diagram depicting a channel shuffle operation performed in the calculation method using pixel-channel shuffle convolutional neural network in one embodiment of the disclosure.

Next, in step S405 of FIG. 4, the operating system performs a channel shuffle operation upon the values formed by the pixel shuffle operation. The related process in the channel shuffle operation of the calculation method is shown in FIG. 7.

FIG. 7(A) shows the input data being halved in length and width through the above-described pixel shuffle operation. The values applied to the convolution operation can be selected from each group of the input data according to a specific rule. The selected values form a plurality of groups of new input data that can also be temporarily stored in the memory. For example, the values are selected from the first group of input data (I_A) at an interval in accordance with the configuration of filters. In the current example, one is selected from every four values, and in general the feature maps with number 4k+1 ('k' is 0, 1, 2, 3, etc.) are selected. Further, the values in every four values are selected from the second group of input data (I_B). Generally, the feature maps with number 4k+2 ('k' is 0, 1, 2, 3, etc.) are selected in the second group of input data (I_B). The values in every four values are selected from the third group of input data (I_C), and in which the feature maps with 4k+3 ('k' is 0, 1, 2, 3, etc.) are selected. Further, the values in every four values are selected from the fourth group of input data (I_D), and in which the feature maps with 4k+4 ('k' is 0, 1, 2, 3, etc.) are selected.

FIG. 7(B) schematically shows the values selected from the first group of input data (I_A), the second group of input data (I_B), the third group of input data (I_C) and the fourth group of input data (I_D) being re-arranged at several front layers.

FIG. 7(C) shows the unselected values of the input data not participated in the convolution operation being abandoned. The figure shows that the original 16 feature maps of the input data are reduced to 4. It also indicates that the channel shuffle operation minimizes the number of feature maps of the input data, e.g. to one quarter of the original number. A new first group of input data (I_A'), a new second group of input data (I_B'), a new third group of input data (I_C') and a new fourth group of input data (I_D') are formed.

In step S407 of FIG. 4, the operating system performs a channel shuffle operation and abandons the unselected values. In particular, the dimension of depth is reduced to a third amount C1' when compared to its first amount C1 of depth in the original input data. The original input data with the first amount C1 of depth is processed by the pixel shuffle and the channel shuffle operations so as to form the plurality of new input data with depth (C1') smaller than the first amount of depth. The current example shows the new input data becomes one quarter of the original data so as to form the new input data (I_A', I_B', I_C', I_D') that are participated into the further convolution operation.

Figure 8:
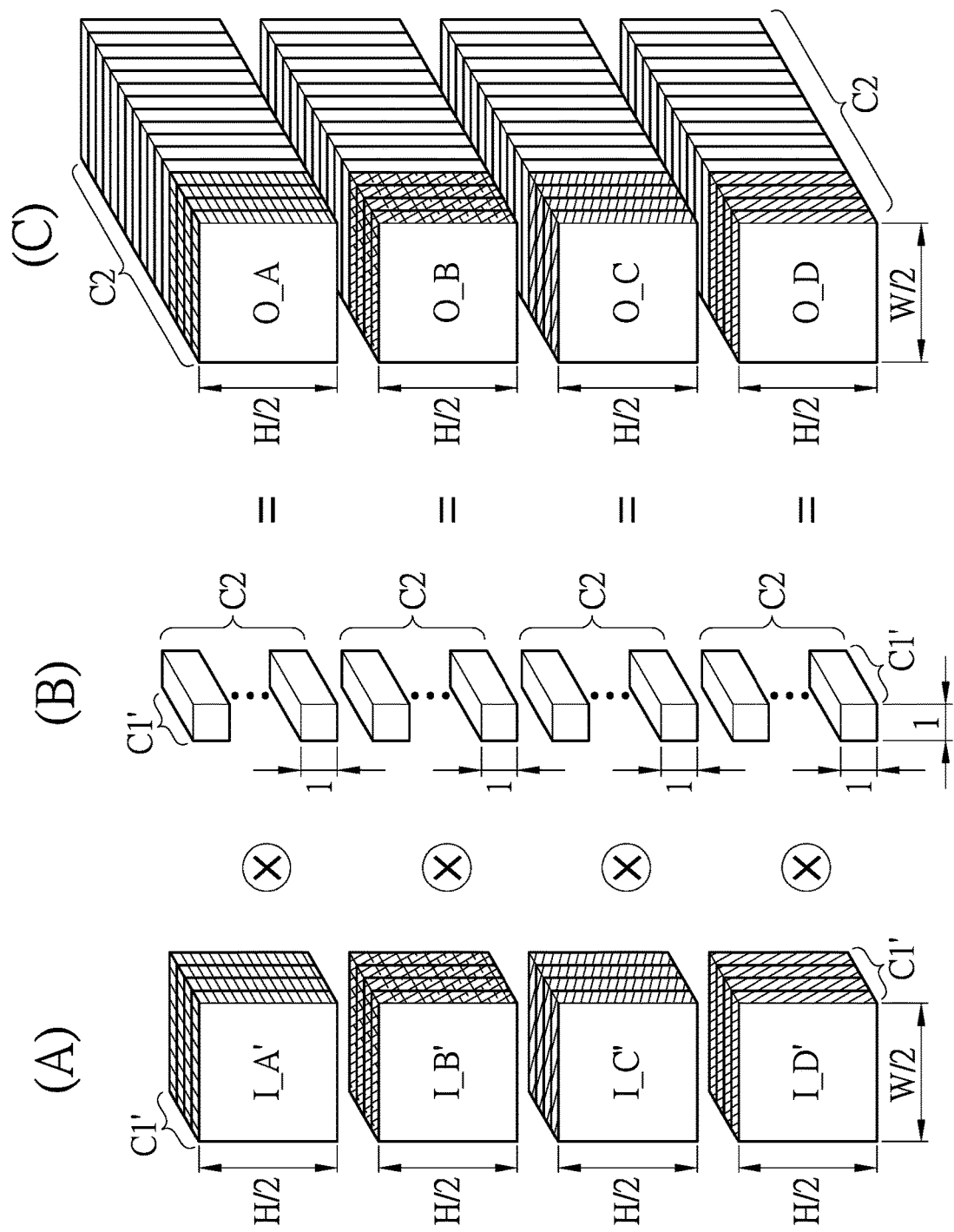
FIG. 8 is a schematic diagram describing the calculation method using pixel-channel shuffle convolutional neural network according to one of the embodiments of the disclosure.

FIG. 8 shows a schematic diagram depicting convolution operation performed in the calculation method using pixel-channel shuffle convolutional neural network according to one embodiment of the disclosure.

FIG. 8(A) shows that the amount of feature maps of the new first group of input data (I_A'), the second group of input data (I_B'), the third group of input data (I_C') or the fourth group of input data (I_D') has been reduced through the pixel shuffle operation and the channel shuffle operation in the convolution operation in one embodiment of the disclosure. The example shows the amount of depths of the new groups of input data are reduced to the third amount C1'. Further, the first group of input data (I_A'), second group of input data (I_B'), third group of input data (I_C') and fourth group of input data (I_D') are calculated by convolution operation with the filters with the third amount C1' of depth, and the filters of the current example are implemented by four groups of convolution kernels. The system sets up the filter, i.e. the convolution kernel, corresponding to every new group of input data. For example, a second amount C2 of the filters, e.g. 1*1*4 filter, is provided. Every group of filter is separated from the original filters according to a specific rule. In the current example, the depth of the convolution kernel becomes one quarter of the original depth, i.e. the third amount C1'. In step S409 of FIG. 4, a convolution kernel is defined corresponding to the groups of input data (I_A', I_B', I_C', I_D') that participate in the convolution operation. The depth of the convolution kernel is also reduced so as to form the second amount C2 of the filters.

In step S411 of FIG. 4, the multiplier-accumulator of the processor of the operating system is used to perform convolution operation with the convolution kernel set up in the step S409 and the plurality of groups of input data. As shown in FIG. 8(C), four groups of output data such as the first group of output data (O_A), the second group of output data (O_B), the third group of output data (O_C) and the fourth group of output data (O_D) are produced by the convolution operation. The length and width of each group of output data are consistent with the length (H/2) and width (W/2) of the input data being processed by the pixel shuffle operation and the channel shuffle operation. The depth of the output data is consistent with the second amount C2 of convolution kernels. The plurality of groups of output data are such as the image features extracted from the original input data, e.g. the image data, and the feature maps are with the second amount C2 of depth in the current example. The feature maps can also be temporarily stored in the memory.

Figure 9:
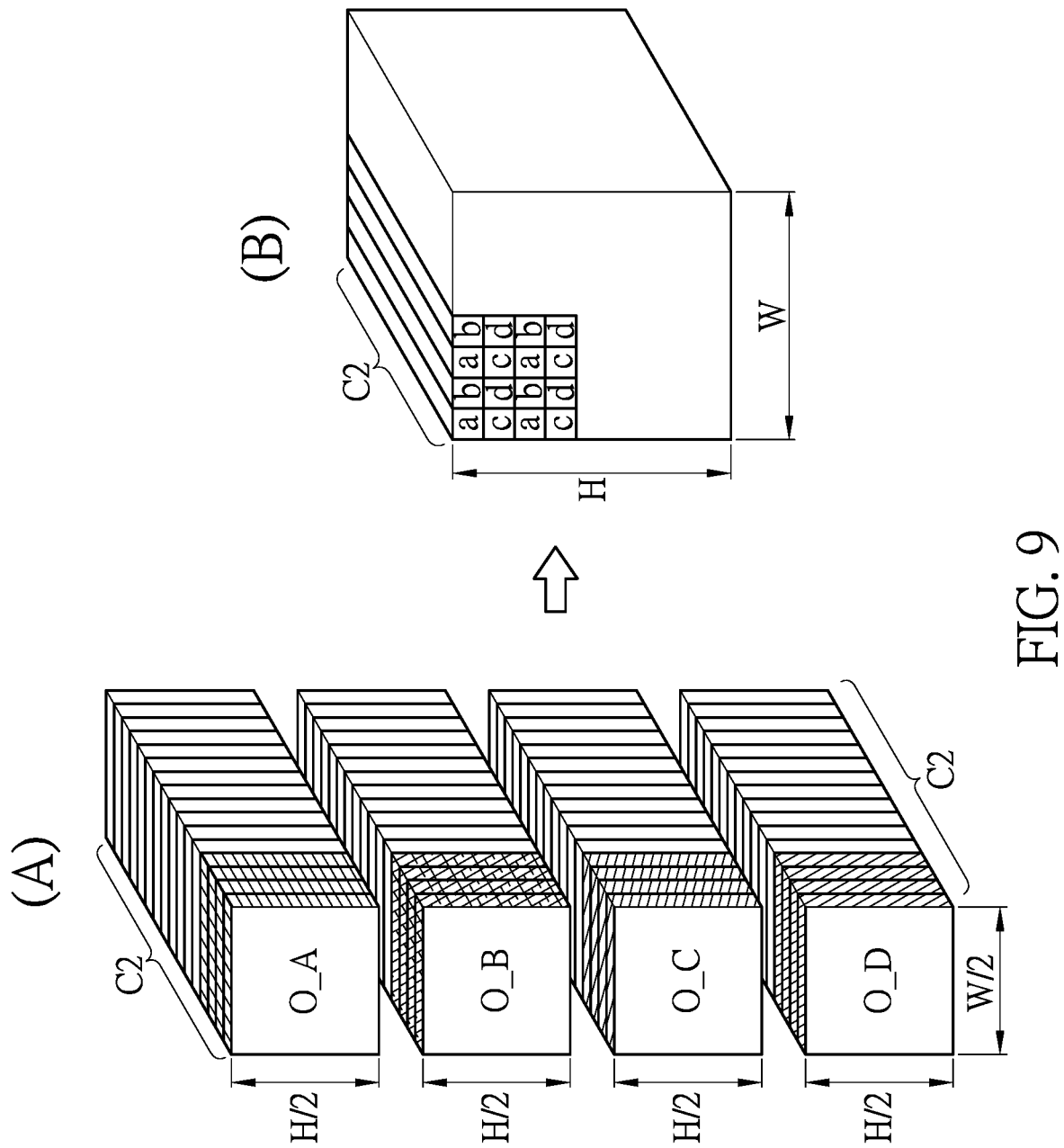
FIG. 9 is a schematic diagram depicting an inverse pixel shuffle in the calculation method in one embodiment of the disclosure.

When the operating system has completed the convolution operation and produced the groups of output data, an inverse pixel shuffle operation shown in FIG. 9 is performed, such as step S413 of FIG. 4. FIG. 9(A) shows that a first group of output data (O_A), the second group of output data (O_B), the third group of output data (O_C) and the fourth group of output data (O_D) are retrieved from the memory of the system. The output data covers the compositions of the original input data a, b, c and d. Each of the output data can be inversely re-arranged as the final output data with a length, a width and a second amount C2 of depth according to an order of the labels a, b, c and d of the input data, as shown in FIG. 9(B). The final output data can be interpreted as an image feature map of the original image data obtained by the calculation method performed by the operating system. It should be noted that the image feature map indicate the image features extracted from the original image data through the calculation method. The image feature map can be provided for a specific system to recognize the original image.

According to the above-described embodiments of the calculation method using pixel-channel shuffle convolutional neural network, the input data used in the pixel shuffle operation can be adjusted based on the practical requirements, the size of the convolution kernel used for convolution operation can also be changed according to an actual need, and the length, the width and the depth of each of the convolution kernels used in the convolution operation are positive integers. Consequently, the final output data and the original input data have the same values and the same amount of parameters, but the amount of multiplier-accumulator required in the system can be greatly minimized.

In summation, the calculation method using the pixel-channel shuffle convolutional neural network and the system thereof in accordance with the present disclosure effectively minimize the amount of computation and storage space through the pixel shuffle operation and the channel shuffle operation in advance and still maintain an accuracy of the convolution operation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A calculation method using pixel-channel shuffle convolutional neural network, comprising:
   in an operating system, receiving an original input data that is a value with a length, a width and a depth;
   by a processor of the operating system, performing a pixel shuffle operation on the original input data, in which the original input data is separated into multiple values for reducing a dimension of each of the values;
   by the processor, performing a channel shuffle operation on the multiple values for selecting values used in a convolution operation from each of the multiple values so as to form multiple new input data;
   setting up convolution kernels with respect to the multiple new input data, wherein a second amount of convolution kernels are included, and each of the convolution kernels implements a filter; and
   by a multiplier-accumulator of the processor, performing the convolution operation with the second amount of convolution kernels and the multiple new input data, so as to form a second amount of multiple output data.

2. The method of claim 1, wherein the original input data is an image data, and the operating system performs the convolution operation for extracting image features from the original input data so as to form a plurality of feature maps with a second amount of depth.

3. The method of claim 1, wherein, after forming the new input data by the channel shuffle operation, unselected values of each of the multiple values that are not in the convolution operation are abandoned.

4. The method of claim 1, wherein the original input data is a value with a first amount of depth, and the original input data is processed by the pixel shuffle and the channel shuffle operations so as to form the plurality of input data with the depth smaller than the first amount of depth.

5. The method of claim 1, wherein, a length, a width and a depth of each of the convolution kernels used in the convolution operation are positive integers.

6. The method of claim 2, wherein the second amount of output data are calculated by an inverse pixel shuffle operation so as to form an image feature map with the second amount of depth.

7. The method of claim 4, wherein the original input data is an image data, and the operating system performs the convolution operation for extracting image features from the original input data so as to form a plurality of feature maps with the second amount of depth.

8. The method of claim 7, wherein the second amount of output data are calculated by an inverse pixel shuffle operation so as to form an image feature map with the second amount of depth.

9. The method of claim 8, wherein the image feature map is used to recognize the original input data.

10. An operating system using a pixel-channel shuffle convolutional neural network, comprising:
    a processor, and a communication circuit and a memory that are electrically connected with the processor;
    wherein the processor performs a calculation method using the pixel-channel shuffle convolutional neural network, comprising:
      receiving an original input data that is a value with a length, a width and a depth;
      performing a pixel shuffle operation on the original input data, in which the original input data is separated into multiple values for reducing dimension of each of the values;
      performing a channel shuffle operation on the multiple values for selecting values used in a convolution operation from each of the multiple values so as to form multiple new input data;
      setting up convolution kernels with respect to the multiple new input data, wherein a second amount of convolution kernels are included, and each of the convolution kernels implements a filter; and
      by a multiplier-accumulator of the processor, performing the convolution operation with the second amount of convolution kernels and the multiple new input data, so as to form a second amount of multiple output data.

11. The system of claim 10, wherein the original input data is an image data, and the operating system performs the convolution operation for extracting image features from the original input data so as to form a plurality of feature maps with the second amount of depth.

12. The system of claim 10, wherein, after the new input data is formed by the channel shuffle operation, the unselected values for the convolution operation are abandoned.

13. The system of claim 10, wherein the original input data is a value with a first amount of depth, and the original input data is processed by the pixel shuffle and the channel shuffle operations so as to form the plurality of input data with depth smaller than the first amount of depth.

14. The system of claim 10, wherein, a length, a width and a depth of each of the convolution kernels used in the convolution operation are positive integers.

15. The system of claim 11, wherein the second amount of output data are calculated by an inverse pixel shuffle operation so as to form an image feature map with a second amount of depth.

16. The system of claim 13, wherein the original input data is an image data, and the operating system performs the convolution operation for extracting image features from the original input data so as to form a plurality of feature maps with a second amount of depth.

17. The system of claim 14, wherein the operating system acts as a cloud system that provides a service of image recognition through the calculation method using the pixel-channel shuffle convolutional neural network.

18. The system of claim 14, wherein the operating system implements a circuit system that performs image recognition through the calculation method using the pixel-channel shuffle convolutional neural network.

19. The system of claim 16, wherein the second amount of output data are calculated by an inverse pixel shuffle operation so as to form an image feature map with the second amount of depth.

20. The system of claim 19, wherein image feature map is used to recognize the original input data.

* * * * *